Jan. 15, 1924.
J. R. CRAVATH ET AL
FLOOR LAMP
Filed March 11, 1921      2 Sheets-Sheet 1
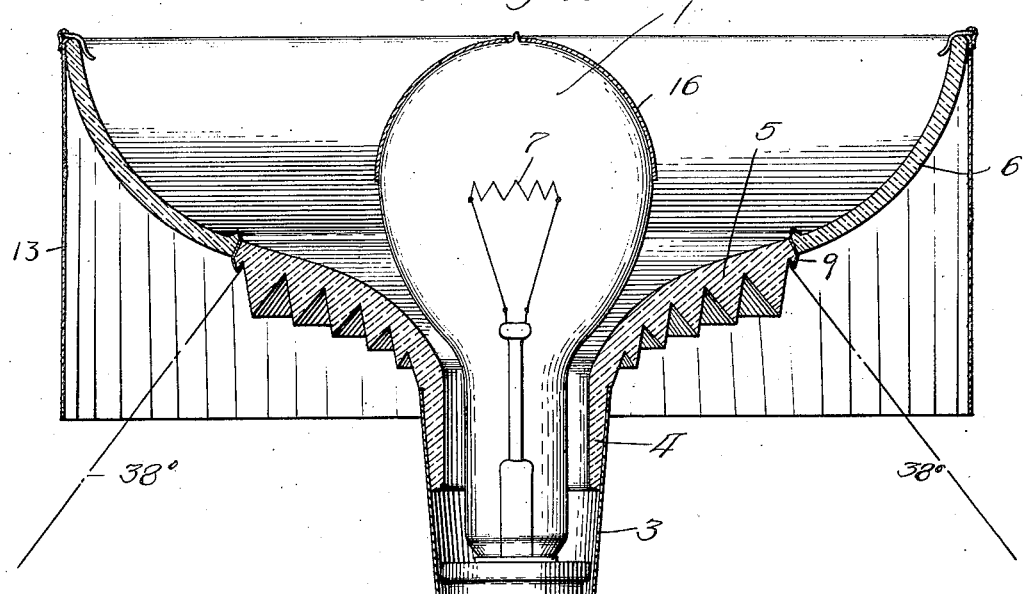
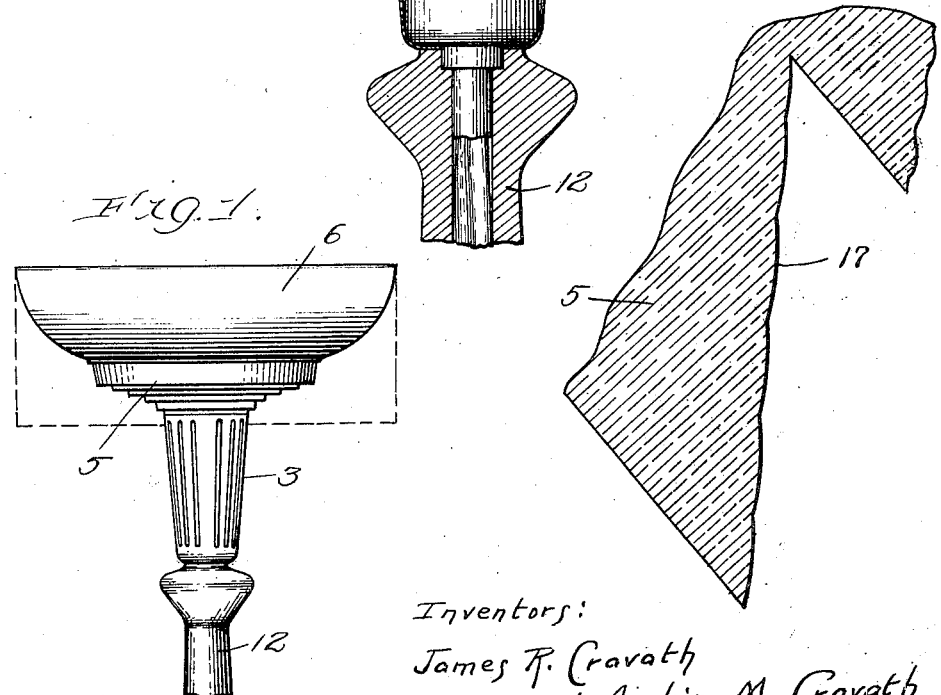
Inventors:
James R. Cravath
and Austin M. Cravath
by Albert Scheible
Attorney Jan. 15, 1924.

J. R. CRAVATH ET AL 1,480,599

FLOOR LAMP

Filed March 11, 1921   2 Sheets-Sheet 2

Inventors:
James R. Cravath
and Austin M. Cravath
by Albert Scheible
Attorney

Witness:
R. L. Tarrington

Patented Jan. 15, 1924.

1,480,599

UNITED STATES PATENT OFFICE.

JAMES R. CRAVATH AND AUSTIN M. CRAVATH, OF BERKELEY, CALIFORNIA.

FLOOR LAMP.

Application filed March 11, 1921. Serial No. 451,499.

*To all whom it may concern:*

Be it known that we, JAMES R. CRAVATH and AUSTIN M. CRAVATH, both citizens of the United States, residing at Berkeley, in the county of Alameda and State of California, have invented certain new and useful Improvements in a Floor Lamp; and we do hereby declare the following to be a full, clear, and exact description of the invention, such as will enable others skilled in the art to which it appertains to make and use the same.

Our invention relates to lighting devices and in some of its general aspects aims to provide novel, simple and effective means for distributing the light of a lamp in definite proportions in various directions, and for so blending such a multi-directioned distribution of the light as to produce a highly pleasing effect. For this purpose, our invention aims to provide a combined direct and indirect lighting unit which will cooperate with a more elevated surface (such as a ceiling) in affording a general illumination, and which will also afford a more intense illumination for reading purposes or the like near the lamp. For such purposes, our invention particularly aims to provide an easily manufactured, simple and handsome floor lamp affording a highly effective light distribution so as to combine an effectively intense downward illumination with a pleasing general lighting effect in a highly pleasing manner. It also aims to confine the direct downward rays of light from the lamp to so small an angle from the nadir as to prevent glare, and aims to prevent this direct light from being streaked.

Considered independently of a particular embodiment such as a floor lamp, our invention aims to provide a simple and highly effective unit for distributing light from a given source (and preferably from a single gas filled incandescent electric lamp) in definite proportions and in definitely directed distribution; to provide easily manufactured light-distributing parts for this purpose; and to provide simple means for supporting such light distributing elements in proper operative disposition with respect to a lamp.

Still further and more detailed objects will appear from the following specification and from the accompanying drawing, in which—

Fig. 1 is an elevation of a lighting unit embodying our invention, including the upper portion of a pedestal supporting the same.

Fig. 2 is an enlarged central and vertical section through the main portion of the same lighting unit.

Fig. 3 is a further enlargement of a part of the prismatic glass portion illustrated sectionally in Fig. 2, showing the method of shaping the laterally outward prismatic surfaces for eliminating streaks in the light.

Figure 4:
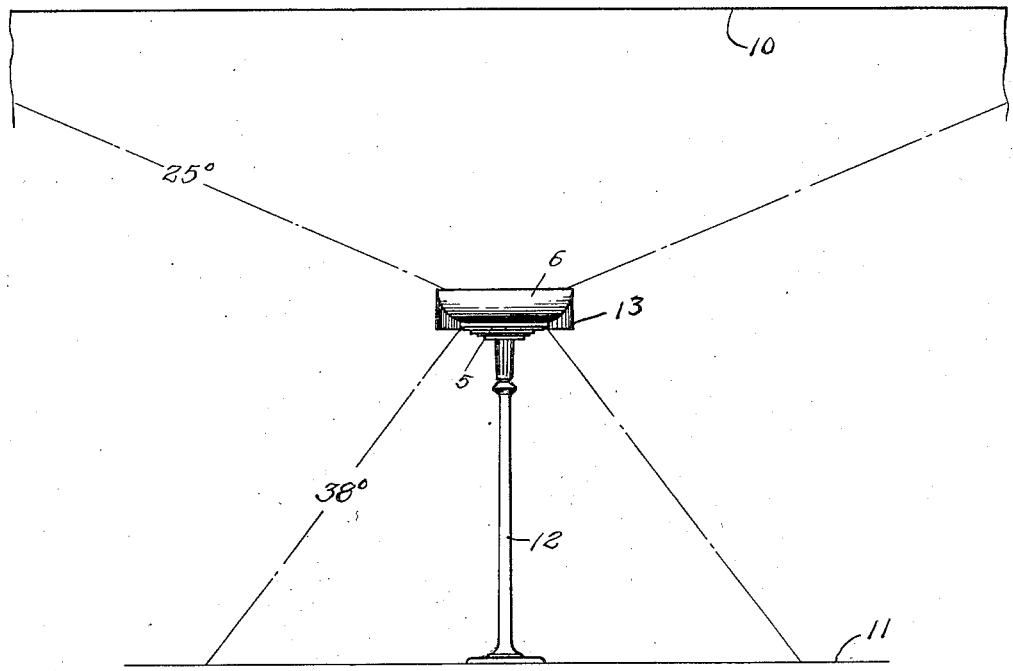
Fig. 4 is an elevation on a reduced scale, showing a floor lamp embodying our invention and indicating the cut-off lines for the light directed towards the ceiling and for that directed in definite directions towards the floor.

In the embodiment of the drawings, we are showing our invention as used in connection with a tungsten lamp 1 of the nitrogen-filled type, carried by a socket 2 which is supported by the top of a suitable vertical pedestal 12. Both the socket and the major portion of the neck of the lamp are housed by a holder 3 in the form of an inverted and somewhat flaring elongated cup which has its mouth disposed below the juncture of the neck and bulb of the lamp. Socketed in this mouth portion of the holder is the tubular stem 4 of a light-distributing member which is substantially funnel-shaped, and which includes an outwardly flaring clear glass portion 5 connecting the stem 4 with an annular rim portion 6 of a non-transparent glass. The parts 4 and 5 of this light-distributing member are desirably integral with each other and made of crystal glass so as to afford the desired transparency for permitting a considerable portion of the downward light from the filament 7 of the lamp to pass through the glass toward the floor 11 of the room. The outer annular portion 6 is desirably of a translucent but non-transparent glass such as an opal glass, so that this will reflect a part of the light reaching it from the filament and will permit another portion of this light to pass through it in the form of diffused light of low intensity. Thus arranged, it will be obvious that the outer glass portion 6 will act after the manner of a semi-indirect bowl or reflector in deflecting light towards the ceiling 10 of the room, from which ceiling it will then be more widely deflected and diffused. Consequently, the light as thus reflected from the ceiling will cooperate with that passing through the opal glass rim in affording the desired general illumination for the room.

At the same time, the light passing through the intermediate portion 5 will afford illumination of much higher intensity within a certain radius from the fixture. To utilize this part of the rays of light effectively in a lighting unit of fairly compact size and pleasing proportions, we desirably employ a mounting which will support the lamp so that its light-emitting filament will be somewhat above the top of the crystal glass portion. We desirably form this clear glass portion so that it will concentrate the light passing through it towards the vertical axis of the fixture, so as to give whatever high intensity may be desired, while keeping glare out of the eyes of the persons in the room. For this latter purpose, we preferably equip this clear glass portion on its lower face with annular prisms affording substantially the effect of a concentrating lens, and we desirably proportion the various parts so that the direct concentrated light will issue within a cone having its sides at an angle of approximtely 38 degrees from the axis of the fixture.

We also preferably equip this lens portion or prismatic glass portion with means for breaking up objectionable streaks, as for example after the manner disclosed in Fig. 3. In this figure we have shown this lens portion 5 as consisting of an upwardly flaring and substantially funnel-shaped member equipped on its exterior with a series of annular prisms all of which have downwardly directed apices and approximately upright outer faces. Each of these outer faces is composed of a plurality of slightly convexed annular surfaces 17, so that an enlarged central and vertical section through one of these annular prisms shows the outwardly directed face of the same to be composed of a succession of curves of relatively large radius, as shown in Fig. 3. These convexities cooperate in breaking up the streaks in the light which would otherwise result from the projecting of the lamp filament, although the shallowness of the convexities afford a sufficient general taper to the exterior of the prism to permit the glass to be extracted from the mold. In other words, the laterally outward surface of each annular prism in a section taken through the axis of the prism is composed of a series of arcs departing only slightly from a line which is downwardly inclined towards the axis of the prism, so that each laterally outward prism surface is approximately a portion of an upwardly bearing conical surface, but is deformed sufficiently to break up filament images.

The rim portion 6 may be made initially of a separate piece of glass, and this may be secured to the intermediate portion 5 by any suitable means, such as the several brass clips 9 as shown in Fig. 2. When desired, the fixture as above described may also be ornamented by supporting a textile curtain or shade 13 upon the same, which can be of any desired color or pattern.

Figure 5:
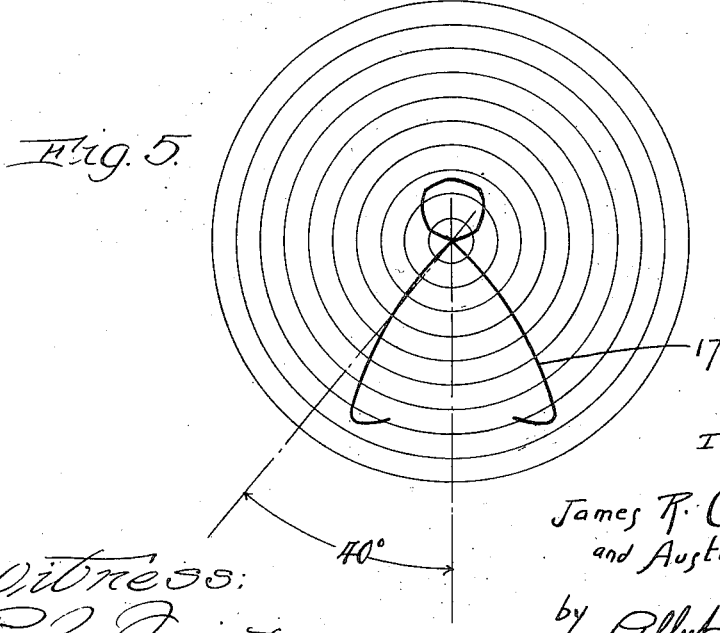
Fig. 5 is a polar coordinate diagram showing the resulting light distribution as plotted in a vertical plane through the axis of the floor lamp.

It will be obvious from the drawings that the relative amount and direction of the light distributed from the refracting lens 5, from the translucent diffusing and reflecting rim 6 and direct from the lamp will depend upon the relative sizes and shapes of these parts and on their positions in relation to the source of light. The resulting effects can therefore be varied by changing these relative sizes and proportions, but we have found that a particularly pleasing general effect will be produced when the parts are so proportioned as to produce a light intensity distribution corresponding substantially to that shown in Fig. 5, namely one in which the sides 17 of the curve portion defining the downwardly directed light substantially form a gothic arch, and in which this arch is surmounted by an approximately oval curve showing the upward light distribution. With the height of floor lamps now popular, we desirably proportion the parts so that the lower or gothic arch portion of the light distribution curve will have the upper portions of its sides diverging by angles of approximately forty degrees from the vertical, thus securing the highly desirable light distribution shown by the diagram of Fig. 5, although we do not wish to be limited to these particular proportions.

However, while we have illustrated and described our invention in a highly desirable embodiment including certain details of construction, we do not wish to be limited to these or other details of the construction and arrangement thus disclosed, it being obvious that the same might be modified in many ways without departing from the spirit of our invention or from the appended claims.

We claim as our invention:—

1. In a lighting unit, a glass refractor having on its outer face a series of concentric annular prisms, each prism having its laterally outward face composed of a plurality of convex annular surfaces of relatively slight transverse convexity.

2. In a lighting unit, a glass refractor having on its outer face a series of concentric annular prisms, each prism having its laterally outward face composed of a plurality of consecutive and convex annular surfaces of relatively slight transverse convexity, each such outward face approximating a portion of a conical surface.

3. A substantially funnel-shaped light-distributing member of substantially clear glass having on the outer face of its mouth portion a plurality of annular prisms, each of the said prisms having its radially outward face composed of a series of relatively shallow convex annular surfaces.

4. In a lighting unit, a substantially funnel shaped light refracting element, a source of light disposed beyond the large end of the said element and coaxial therewith, the bore of the said element being convexed towards the source of light, the said element having the portion adjacent to its stem provided with refracting formations arranged for permitting light to pass through the same from the source of light towards the smaller end of the said element and for concentrating the light thus passing through the same.

5. In a lighting unit, an upright incandescent lamp and a light-distributing member coaxial with the lamp; the said member comprising in continuously flaring formation an annularly ribbed transparent glass portion laterally housing only the portion of the lamp below the source of light and an unribbed portion laterally housing the source of light and extending above the latter.

6. In a lighting unit, an upright incandescent lamp, and a light-distributing member coaxial therewith and comprising an upper annular portion connected by an intermediate clear glass portion to a downwardly extending tubular stem, the intermediate portion being equipped on its outer face with annular prisms arranged for downwardly concentrating direct rays of light from the lamp, and the upper annular portion being non-transparent.

7. A light-distributing member comprising in substantially funnel-shaped formation an upper annular portion connected by an intermediate portion to a downwardly extending tubular stem, the said annular portion being non-transparent and the intermediate portion being constructed for concentrating the light passing through the same from a source of light housed by the said member and disposed above the intermediate portion.

8. In a floor lamp, an upright lamp, a substantially funnel-shaped and upwardly open light distributing member coaxial therewith and having upper and lower portions disposed in continuation of each other and respectively arranged for directing light from the lamp towards the ceiling and towards the floor, the said portions being so arranged as to afford a concentration of light on the floor having its maximum intensity within a ring coaxial with the lamp and having a maximum radius approximately three-fourths of the height of the lamp above the floor.

9. For use with a source of light, a substantially funnel-shaped and upwardly open light distributing member comprising an upwardly concaved annular portion laterally housing the source of light and disposed for directing light upwardly, and a lower and upwardly convexed annular portion equipped with refracting means for concentrating the light passing through it downwardly, the said portions being so proportioned that the resulting polar coordinate light distribution curves in a vertical plane through the source of light will comprise an approximate oval for the upwardly directed light surmounting a downward distribution curve having sides substantially in the form of a gothic arch.

10. The combination with an incandescent lamp, of a light-distributing member supported coaxially therewith, the said member having a flaring clear glass portion of interiorly convexed section surrounding the portion of the lamp bulb adjacent to the said neck and provided on its outer face with a series of concentric annular prisms having apices directed toward the base of the lamp, and an interiorly concaved glass rim portion extending from the outer edge of the said clear glass portion to a point considerably forward of the lamp filament, the said rim portion being of less translucency than the said prism-carrying portion.

11. A lighting unit as per claim 10, in which the consecutively larger diametered annular prisms have consecutively larger radial cross-sections.

12. A lighting unit as per claim 10, in which each annular prism has its outer face forming substantially a portion of a conical surface tapering towards the base of the lamp.

13. A lighting unit as per claim 10, in which each annular prism has its inner face substantially forming part of a conical surface having its apex forwardly of the filament of the lamp.

14. A lighting unit as per claim 10, in combination with a socket holding the lamp, and a holder mounted on the socket and having a tubular portion extending beyond the mouth of the socket, and a tubular stem integral with the said clear glass portion and socketed in the holder.

Signed at Berkeley, California, March 4, 1921.

JAMES R. CRAVATH.
AUSTIN M. CRAVATH.